Nov. 18, 1969   R. E. MOLIK   3,479,599

SIGNAL SENSITIVE DEPRESSED THRESHOLD DETECTOR

Filed April 5, 1967

INVENTOR
RONALD E. MOLIK

H. H. Loscke
Attorney

United States Patent Office 3,479,599
Patented Nov. 18, 1969

3,479,599
SIGNAL SENSITIVE DEPRESSED THRESHOLD DETECTOR
Ronald E. Molik, Palos Verdes Peninsula, Calif., assignor, by mesne assignments, to the United States of America as represented by the Secretary of the Navy
Filed Apr. 5, 1967, Ser. No. 628,788
Int. Cl. H04b 1/10
U.S. Cl. 325—323                              5 Claims

ABSTRACT OF THE DISCLOSURE

A signal responsive depressed threshold detector circuit having a sampling network to sample the target and noise signals received to produce a mean voltage thereof for summing in a network with a preadjusted threshold voltage to produce an adaptively depressing threshold voltage setting on the output of the summing network in proportion to the signal strength for comparison in a comparator circuit with the received target and noise signals to pass only the target signals.

BACKGROUND OF THE INVENTION

This invention is in the field of threshold detectors and more particularly in automatically establishing this threshold proportional to signal strength.

In prior known detection techniques use is made of either a preadjusted or self-adapting threshold setting referenced only to the receiver mean noise voltage present in the detection circuit. These circuits also may gate the signals which peak above the threshold and they also may so circuit the signals to change the polarity of the signals to cause the noise signals to subtract out of the received signal component. One very common means of isolating target signals is by noise filtering in the receiver circuits.

SUMMARY OF THE INVENTION

In the present invention the received composite target and noise signals are envelope detected and passed through a low pass detection integration filter to a comparator. The detected signals out of the integration filter are sampled and applied to a summing network to which is also applied a preadjusted threshold voltage for summation with the sampled signal voltage. The sampled signal voltage varies in proportion to signal strength and is the mean value of this sampled voltage which will be a function of the signal-to-noise ratio in the received signal. This varying threshold voltage is applied to the comparator to pass voltage signals that equal or exceed the established threshold voltage thereby passing only target signal voltage indications of targets with sufficient strength to exceed the prevailing noise level. It is therefore a general object of this invention to provide a circuit for automatically depressing a threshold voltage in proportion to the mean value of the signal strength to establish the threshold for varying signal-to-noise ratio to allow only target signal voltages to produce an output signal.

BRIEF DESCRIPTION OF THE DRAWING

These and other objects and the attendant advantages, features, and uses of the invention will become more apparent to those skilled in the art as a more detailed description proceeds when considered with the accompanying drawing in which.

DESCRIPTION OF THE PREFERRED EMBODIMENTS

Figure 1:
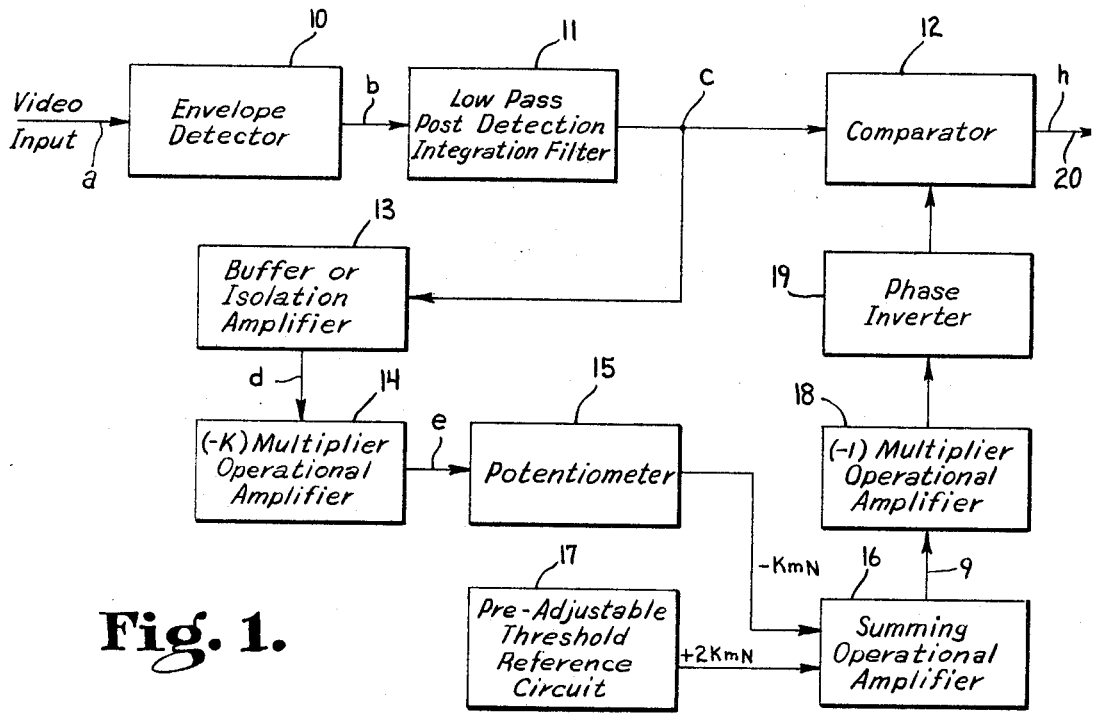
FIGURE 1 is a block circuit schematic diagram of the depressed threshold circuit.
Figure 2:
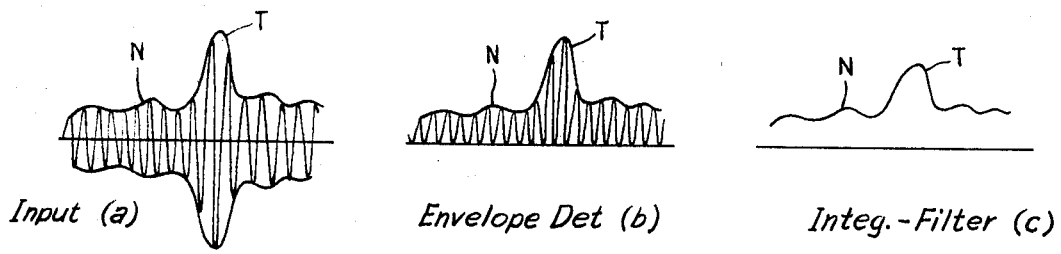
FIGURES 2(a) through 2(h) illustrate the waveforms at the various points (a) through (h) in FIGURE 1 of the drawing.
Figure 2:
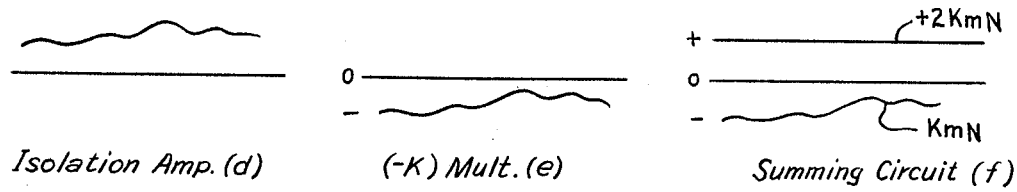
Figure 2:
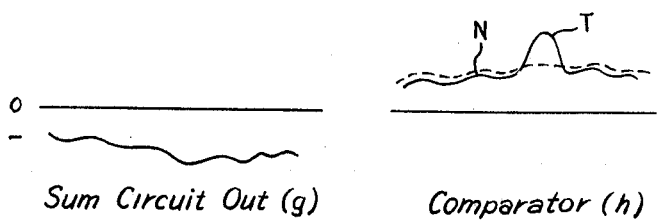

Referring more particularly to FIGURE 1, with occasional reference to FIGURE 2, there is shown a video input $a$ to an envelope detector 10 having its output $b$ coupled to a low pass post detection integration filter 11, the output $c$ of which is coupled to a comparator 12 to produce an output $h$ on the output conductor 20. The video input signal $a$, as shown in FIGURE 2($a$), is detected in the envelope detector 10 to produce the waveform $b$ in FIGURE 2($b$). For a sufficiently narrow bandwidth low pass post detection integration filter 11, the alternating current component of the filter output signal voltage will be of a low frequency content. The primary output signal voltage component will be the direct current voltage component, or mean value of output voltage. The magnitude of this mean voltage output is a function of the ratio of signal-to-noise power present in the receiver from which the video input signal $a$ comes. This mean voltage will increase or decrease as the signal-to-noise ratio increases or decreases and is therefore indicative of the amount of signal power present in the receiver.

A sample of this mean voltage $c$ is applied through a buffer or isolation amplifier 13 to produce the varying direct current voltage $d$, as shown by FIGURE 2($d$), to a $(-k)$ multiplier operational amplifier 14. The amplifier 14 produces the output signal $e$, as shown by FIGURE 3($e$), which is applied through a potentiometer 15. The output of the potentiometer 15 is coupled as one input to a summing operational amplifier 16. A second input to the summing operational amplifier 16 is a preadjustable threshold reference voltage from the circuit 17. The potentiometer 15 is adjusted until the potentiometer output voltage is equal to $-KmN$ where $K$ is a constant determined from the receiver false alarm rate and $mN$ is the mean voltage value of the noise signals alone. The preadjusted threshold in the circuit 17 is preset to equal $+2KmN$. These two inputs to the summing operational amplifier 16 is illustrated in FIGURE 2($f$) to produce the output $g$, as shown in FIGURE 2($g$). The summed voltage $g$ is passed through a $(-1)$ multiplier operational amplifier 18 to compensate for the negative polarity associated with the output of the summing amplifier. This produces the correct threshold voltage level in a positive direct current voltage at the output of 18 but the alternating current component is 180° out-of-phase with respect to the alternating current component of the signal voltage at the output of the low pass post detection integration filter 11. Accordingly, the signal is inverted by a phase inverter 19 to remove this discrepancy to apply the depressed threshold voltage as the second input to the comparator 12. As shown in FIGURE 2($h$), the waveform in a solid line is the waveform $c$ while the depressed threshold voltage is shown in dotted lines. If the filter 11 output voltage signal equals or exceeds the depressed threshold voltage sum of the summing amplifier 16, the comparator 12 will produce an output voltage on the conductor means 20 thereby passing only target signal voltages, as will become clear in the description of operation.

OPERATION

Let it be assumed that the input signal $a$, as shown in FIGURE 2($a$), is composed of noise signals N and one target signal T. The composite noise and target signals will remain in the detected envelope, as illustrated in FIGURE 2($b$), and will remain in the waveform as shown in FIGURE 2($c$). The waveform, as shown in FIGURE 2($c$), is applied as one input to the comparator 12. The buffer or isolation amplifier 13 averages high peaks and accordingly produces a varying direct current voltage or an alternating current voltage at a direct current level, as shown in FIGURE 2(d). The output voltages of the potentiometer 15 and the preadjusted threshold voltage from the circuit 17 may be measured by using an RMS volt meter which, when once the potentiometer is adjusted, will provide the depressed threshold voltage on the output g of the summing operational amplifier to suppress all the noise signals from the video input a. This depressed threshold voltage g from the amplifier 16 is conditioned in the circuits 18 and 19 and applied to the comparator 12 to establish a varying bias level therefor with the limit above the noise signals N, as shown in FIGURE 2(b), so that only the target signals T will appear on the output 20 of the comparator. Accordingly, the circuit shown in FIGURE 1 could be used in each filter channel of a radar receiver to improve the overall radar system performance by increasing target detection range.

While many modifications and changes may be made in the constructional details and features of this invention to provide similar results within the spirit of this invention, I desire to be limited therein only by the scope of the appended claims.

I claim:

1. A signal sensitive depressed threshold detector comprising:
   an input of video signals;
   an envelope detector coupled to said input to detect video signals, which includes noise signals, on an output thereof;
   first means coupled to said detector output for producing a mean voltage of said video and noise signals;
   a comparator having one input coupled to said first means output and having a second input and an output;
   a summing means having two inputs and an output, said output being coupled through conditioning networks to said second input of said comparator;
   second means coupling said first means output and one input of said summing means to apply said mean voltage values to said summing means; and
   a preadjusted threshold voltage applied to said second input of said summing means to establish a threshold voltage on said comparator varying as a function of signal strength to pass only target signal voltages on said comparator output.

2. A signal sensitive depressed threshold detector as set forth in claim 1 wherein
   said first means coupled to said detector output for producing a mean voltage is a low pass post detection integration filter.

3. A signal sensitive depressed threshold detector as set forth in claim 2 wherein
   said second means includes an isolation amplifier, a first (−1) multiplier operational amplifier, and a potentiometer in series, said potentiometer being operative to adjust said mean voltage value to the mean voltage value of said noise signals alone.

4. A signal sensitive depressed threshold detector as set forth in claim 3 wherein
   said conditioning network includes a second (−1) multiplier operational amplifier and a phase inverter to condition said varying threshold voltage to be in phase with said video and noise signals applied to said comparator from said first means output.

5. A signal sensitive depressed threshold detector as set forth in claim 4 wherein
   said first amplifier (−1) multiplier operational amplifier is a (−k) multiplier operational amplifier where k is a constant representative of the receiver false alarm rate.

References Cited

UNITED STATES PATENTS

| | | | |
|---|---|---|---|
| 3,094,665 | 6/1963 | Wildman | 325—475 |
| 3,372,234 | 3/1968 | Bowsher et al. | 325—323 X |

ROBERT L. GRIFFIN, Primary Examiner

W. S. FROMMER, Assistant Examiner

U.S. Cl. X.R.

325—473, 478; 328—146